United States Patent [19]

Meddaugh

[11] Patent Number: 4,505,955
[45] Date of Patent: Mar. 19, 1985

[54] MINERAL PARTICLES BOUND WITH SILICONE ELASTOMERIC EMULSION

[75] Inventor: Michael D. Meddaugh, Midland, Mich.

[73] Assignee: Dow Corning Corporation, Midland, Mich.

[21] Appl. No.: 288,278

[22] Filed: Jul. 30, 1981

[51] Int. Cl.³ .............................................. B05D 3/02
[52] U.S. Cl. .................................. 427/393; 427/158; 427/159; 427/387; 427/391; 427/393.6; 524/493; 524/731; 524/837; 524/863
[58] Field of Search ............... 427/387, 158, 391, 159, 427/393, 393.6; 428/304.4, 318.4, 319.3, 319.7, 308; 260/375 B, 29.2 M; 106/2, 33; 52/309.4, 354, 515, 517, 309.9, 405; 524/493, 588, 731, 837, 863, 860

[56] References Cited

U.S. PATENT DOCUMENTS

| | | | |
|---|---|---|---|
| 3,355,406 | 11/1967 | Cekada, Jr. | 260/29.2 M |
| 3,696,127 | 10/1972 | Matherly | 260/29.2 M X |
| 3,861,939 | 1/1975 | Merrill et al. | 427/387 |
| 4,221,688 | 9/1980 | Johnson et al. | 260/29.2 M |

*Primary Examiner*—Thurman K. Page
*Attorney, Agent, or Firm*—Edward C. Elliott

[57] ABSTRACT

A uniform mixture consisting essentially of an aqueous silicone elastomeric emulsion and mineral particles having an average particle diameter of greater than 150 micrometers is described. The emulsion comprises an anionically stabilized, hydroxyl endblocked polydiorganosiloxane, colloidal silica, and an alkyl tin salt. The uniform mixture can be applied to building surfaces such as structural foam insulation or wooden walls to provide a protective covering. The cured coating can provide protection from weathering, physical damage, and fire.

14 Claims, No Drawings

MINERAL PARTICLES BOUND WITH SILICONE ELASTOMERIC EMULSION

BACKGROUND OF THE INVENTION

1. Field of the Invention

This invention relates to mineral particles as bound together with elastomer-forming silicone emulsions. Also covered are uses of these mixtures as coatings, such as over foam construction insulation.

2. Description of the Prior Art

Many different types of plasters and cements have been developed over the centuries as materials of construction. Such inorganic binders were mixed with sand and stone aggregate to produce roads, walls and buildings. These structures were generally serviceable, but porous. Moisture would soak into the structure causing various problems such as damp interiors in buildings. When the moisture subsequently evaporated from walls, it sometimes carried dissolved salts to the wall surface causing unsightly staining on the surface and failure of the surface through spalling in extreme cases. In climates where the temperature fell below the freezing point of water, the moisture in the structure could freeze, expanding and causing the surface of the structure to break up and crumble away.

Improved types of plasters and cements have been developed through the addition of emulsions of various organic polymers such as polyvinylacetate and styrene-butadiene to the mixtures. These modified materials exhibit adhesion to substrates, improved strength, and improved durability. Because of their organic nature, they were subjected to weathering and aging problems not evident in the original inorganic mixtures.

Organic emulsions have also been mixed with aggregates to manufacture floor and wall covering materials such as the terrazo type compositions. These materials suffer in that they have a limited life due to the organic nature of the binder.

SUMMARY OF THE INVENTION

An elastomer-forming, silicone emulsion was discovered to be an effective binder for mineral particles. The cured uniform mixture ranges from a flexible to a rigid material depending upon the ratio of binder to mineral particles.

The elastomer-forming, silicone emulsion comprises a continuous aqueous phase and a dispersed phase comprising an anionically stabilized, hydroxyl endblocked polydiorganosiloxane, a colloidal silica, and an alkyl tin salt, the emulsion having a pH of from 9 to 11.5. By mixing mineral particles, such as sand, with the silicone elastomeric emulsion and then drying the mixture, a cured product results which exhibits desirable physical properties. The cured products are water repellent or waterproof with improved resistance to weathering, water immersion and temperature extremes.

Mixtures produced in accordance with this invention can be used to provide a protective surface over substrates such as foam structural insulation. The protective surface shields the insulation from damage due to weathering and protects it from physical assault as well. The mixtures are also useful in protecting substrates such as masonry and wood.

It is an object of this invention to provide a unique mixture comprising mineral particles uniformly mixed with an elastomer-forming silicone emulsion.

It is an object of this invention to provide unique mixtures suitable for coating over a substrate to protect it from weathering and physical damage.

DESCRIPTION OF THE INVENTION

This invention relates to a uniform mixture consisting essentially of (A) an aqueous silicone elastomeric emulsion comprising (i) 100 parts by weight of an anionically stabilized, hydroxyl endblocked polydiorganosiloxane present as an oil-in-water emulsion, (ii) from 1 to 150 parts by weight of colloidal silica having an average particle diameter of less than 0.5 micrometers, (iii) from 0 to 200 parts by weight of filler other than colloidal silica, said filler having an average particle diameter of less than 10 micrometers, and (iv) from 0.1 to 2.0 parts by weight of alkyl tin salt, said emulsion having a pH of 9 to 11.5, and (B) mineral particles having an average particle diameter of greater than 150 micrometers, the ratio of (A) to (B) being such that upon the removal of the water, there is present 1 part by volume of silicone elastomer from (A) and from 3 to 40 parts by volume of (B).

The mixture of this invention is a unique combination of mineral particles bound together with an elastomer-forming silicone emulsion. Depending upon the ratio of silicone emulsion to mineral particles, the cured mixture can vary from decidedly flexible, elastomeric material to a hard, rigid material. The silicone binder in the mixture causes the cured mixture to be water repellent or waterproof, depending upon the amount of binder used. One useful embodiment of this invention is the use of a mixture of this invention as a plaster or stucco replacement in covering a substrate such as a foam or wood siding on a building. Such a coating is well suited to protect the substrate from weathering, rain, mechanical damage, and even from fire.

The elastomer-forming silicone emulsion used in the mixture of the instant invention is disclosed in U.S. Pat. No. 4,221,688, issued Sept. 9, 1980, to Johnson, Saam, and Schmidt, which is hereby incorporated by reference to show the silicone emulsion and methods of preparation.

The silicone emulsion comprises an anionically stabilized, hydroxyl endblocked polydiorganosiloxane, a colloidal silica, and an alkyl tin salt. These emulsions provide a cured elastomeric film by evaporation of the water under ambient conditions.

The silicone emulsion used in this invention has a continuous water phase in which there are dispersed phases which comprise an anionically stabilized hydroxyl endblocked polydiorganosiloxane, colloidal silica, and an alkyl tin salt. For the silicone emulsion to maintain a storage stability and also be curable to an elastomer after the emulsion is stored, the pH of the silicone emulsion must be 9 to 11.5. The silicone emulsions used in this invention which have the best storage stability and still form elastomers at ambient conditions at any point during the storage stable period are those which have a pH in the range of 10.5 to 11.5.

These silicone emulsions which contain in the dispersed phase the hydroxyl endblocked polydiorganosiloxane, colloidal silica, and alkyl tin salt and having a pH of 9 to 11.5 do not require additional ingredients to obtain an elastomeric product after the water is removed at ambient conditions. However, certain additional ingredients have been found useful. For example, a thickener can be added to improve the handling characteristics of the silicone emulsion such as thixotropy and structural viscosity. The thickener is useful for increasing the working viscosity of the silicone emulsion.

The hydroxyl endblocked polydiorganosiloxanes preferred in the instant invention should have a weight average molecular weight (Mw) of at least 30,000. Tensile strengths and elongations at break improve with increasing molecular weight, with reasonable tensile strengths and elongations obtained above 30,000 Mw and the best tensile strengths and elongations obtained above 50,000 Mw. The maximum weight average molecular weight is one which can be emulsified and which will give elastomeric properties to the product obtained after the water is removed from the emulsion. Weight average molecular weights up to about 1,000,000 for the hydroxyl endblocked polydiorganosiloxane are expected to be practical for this invention. The preferred Mw for the hydroxyl endblocked polydiorganosiloxanes are in the range of 200,000 to 700,000.

The organic radicals of the hydroxyl endblocked polydiorganosiloxane can be monovalent hydrocarbon radicals containing less than seven carbon atoms per radical and 2-(perfluoroalkyl)ethyl radicals containing less than seven carbon atoms per radical. Examples of monovalent hydrocarbon radicals include methyl, ethyl, propyl, butyl, isopropyl, pentyl, hexyl, vinyl, cyclohexyl and phenyl and examples of 2-(perfluoroalkyl)ethyl radicals include 3,3,3-trifluoropropyl and 2-(perfluorobutyl)ethyl. The hydroxyl endblocked polydiorganosiloxanes preferably contain organic radicals in which at least 50 percent are methyl. The preferred hydroxyl endblocked polydiorganosiloxanes are the hydroxyl endblocked polydimethylsiloxanes.

The preferred hydroxyl endblocked polydiorganosiloxanes are those prepared by the method of anionic emulsion polymerization described by Findlay et al. in U.S. Pat. No. 3,294,725, issued Dec. 27, 1966, which is hereby incorporated by reference to show the methods of polymerization and to show the hydroxyl endblocked polydiorganosiloxane in emulsion. Another method of preparing hydroxyl endblocked polydiorganosiloxane is described by Hyde et al. in U.S. Pat. No. 2,891,920, issued June 23, 1959, which is hereby incorporated by reference to show the hydroxyl endblocked polydiorganosiloxanes and their method of preparation. These methods and others are known in the art. The hydroxyl endblocked polydiorganosiloxanes used in this invention are those which are anionically stabilized. For the purpose of this invention, "anionically stabilized" means the hydroxyl endblocked polydiorganosiloxane is stabilized in emulsion with an anionic surfactant. The emulsion is in the form of an oil-in-water emulsion.

Anionic surfactants are preferably the salt of the surface active sulfonic acids used in the emulsion polymerization to form the hydroxyl endblocked polydiorganosiloxane as shown in U.S. Pat. No. 3,294,725 cited above which is hereby incorporated by reference to show the surface active sulfonic acids and salts thereof. The alkali metal salts of the sulfonic acids are preferred, particularly the sodium salts. The sulfonic acid can be illustrated by aliphatically substituted benzenesulfonic acids, aliphatically substituted naphthalene sulfonic acids, aliphatic sulfonic acids, silylalkylsulfonic acids and aliphatically substituted diphenylethersulfonic acids.

One of the advantages of the silicone emulsion used in the present invention is the relatively small amount of surfactant or emulsifying agent needed to maintain a stable emulsion. The amount of anionic emulsifying agent can be less than 2 weight percent of the emulsion, wherein this amount can result from the neutralized sulfonic acid wherein the sulfonic acid is used in the emulsion polymerization method for the preparation of the hydroxyl endblocked polydiorganosiloxane. Other anionic emulsifying agents can be used, for example, alkali metal sulforicinoleates, sulfonated glyceryl esters of fatty acids, salts of sulfonated monovalent alcohol esters, amides of amino sulfonic acid such as the sodium salt of oleyl methyl tauride, sulfonated aromatic hydrocarbon alkali salts such as sodium alpha-naphthalene monosulfonate, condensation products of naphthalene sulfonic acids with formaldehyde, and sulfates such as ammonium lauryl sulfate, triethanol amine lauryl sulfate and sodium lauryl ether sulfate.

Although not specifically required in the present invention, one can optionally include nonionic emulsifying agents in addition to the anionic emulsifying agents. Such nonionic emulsifying agents can be illustrated by saponins, condensation products of fatty acids with ethylene oxide such as dodecyl ether of tetraethylene oxide, condensation products of ethylene oxide and surbitan trioleate, condensation products of phenolic compounds having side chains with ethylene oxide such as condensation products of ethylene oxide with isododecylphenol, and imine derivatives such as polymerized ethylene imine.

Colloidal silica is a required ingredient in the silicone emulsion used in this invention. The silicone emulsion does not yield a cured film upon drying if colloidal silica is not present in the composition. Any of the finely divided colloidal silicas can be used that are capable of being dispersed in the silicone emulsion. The common forms of colloidal silica are available as colloidal silica dispersions in water and as dry powders of fume silica or precipitated silica.

A colloidal silica available as a dispersion in water has been shown to be particularly useful in the silicone emulsion used in this invention. These commercially available colloidal silica dispersions are usually used in a stabilized form, being stabilized with sodium ion, ammonia, or aluminum ion. Aqueous colloidal silica dispersions that have been stabilized with sodium ion are particularly useful because the pH requirement of this invention can be aided by using such a sodium ion stabilized colloidal silica to bring the pH above 9. Colloidal silicas as used herein are those silicas which have particle diameters of from 0.001 to 0.5 micrometer. Preferably, the particle diameters of the colloidal silicas are from 0.001 to 0.05 micrometer.

Suitable thickeners for use in the silicone emulsion used in this invention are available commercially and would be selected for their stability and usability at a pH of 9 to 11.5. Some of the useful thickeners include the classes of cellulose derivatives, alkali salts of polyacrylates an polymethylacrylates, sodium and ammonium salts of carboxylate copolymers and colloidal clays. These and other thickeners can be used, but it is advised that a particular thickener be tried on a small scale to determine that it does not adversely effect the storage stability of the emulsion, the formation of the elastomeric product, or the resulting properties of the elastomeric product. For the silicone emulsions used in this invention, the best thickeners are the sodium salts of polyacrylates.

Another useful ingredient for addition to the silicone emulsions used in this invention is a filler other than colloidal silica. Such fillers can be added to provide pigmentation or as an ultraviolet light screening agent. Other fillers can be used as extending fillers. Examples of fillers other than colloidal silica include carbon blacks, titanium dioxide, clays, aluminum oxide, quartz, calcium carbonate, zinc oxide, mica and various colorant pigments. Titanium dioxide has been found to be particularly useful as an ultraviolet light screening agent. These fillers, other than colloidal silica, should be finely divided and it may be advantageous to use aqueous dispersions of such fillers, if they are commercially obtainable, such as aqueous dispersions of carbon black. However, the silicone emulsions used in the present invention do not require that these fillers be added in the form of aqueous dispersions. The silicone emulsion readily accepts the finely divided fillers in a dry form. Finely divided fillers have an average particle diameter of less than 10 micrometers.

The silicone emulsion used in this invention requires an alkyl tin salt. The alkyl tin salt reduces the time required between the mixing of the ingredients and the time the emulsion will cure to an elastomeric film or removal of the water under ambient conditions. The preferred alkyl tin salts are dialkyltindicarboxylates, such as dibutyltindiacetate, dibutyltindilaurate, and dioctyltindilaurate. The preferred dialkyltindicarboxylate is dioctyltindilaurate. Alkyl tin salts can be used in amounts of from 0.1 to 2.0 parts by weight for each 100 parts by weight of hydroxyl endblocked poydiorganosiloxane, with the preferable amount being from 0.25 to 1 part.

There are also factors to consider concerning the ratio of hydroxyl endblocked polydiorganosiloxane to colloidal silica in the silicone emulsion. The curing mechanism requires that from 1 to 150 parts by weight of colloidal silica be present per 100 parts by weight of the hydroxyl endblocked polydiorganosiloxane. The preferred amount of colloidal silica will normally be determined by the desired modulus of the cured elastomer produced when the emulsion is dried. Increasing the colloidal silica content increases the modulus of the resulting elastomer. The modulus is also effected by the physical form of the colloidal silica. The more surface area or the finer the particles, the less required to give a particular level of modulus. The preferred amount of colloidal silica is from 15 to 50 parts by weight.

Filler other than colloidal silica is used to raise the total solids content of the emulsion while effecting the modulus to a much lesser degree than the colloidal silica. The amount of these extending fillers used depends upon the type of extending filler chosen, the degree of fineness of the particles, and the properties desired in the final cured elastomer. The extending fillers are generally considered to have particle diameters in the range of about 1 to 10 micrometers or surface areas of less than 50 m2/g.

The solids content of the silicone elastomeric emulsion effects the viscosity of the emulsion and the amount of elastomer that is formed when the emulsion is dried. For use in this invention, it is preferred that the solids content of the emulsion be greater than 25 percent by weight based upon the total weight of the emulsion. The solids content is the percent of nonvolatile material remaining in a 2 gram sample of the emulsion that has been heated for 1 hour at 150° C. in an air circulating oven. The sample is in an aluminum foil dish, 60 mm in diameter and 15 mm deep.

The dispersed phase requires hydroxyl endblocked polydiorganosiloxane and colloidal silica. In view of the required pH range of the silicone emulsion, the hydroxyl endblocked polydiorganosiloxane may not contain exclusively silicon-bonded hydroxyl radicals. Some of the hydrogen atoms of the silicon-bonded hydroxyl radicals may be replaced with an alkali metal ion, such as sodium ion; may be complexed with an amine, or may be associated with an emulsifying agent. Thus, the term "hydroxyl endblocked polydiorganosiloxane" as used herein covers all the species of terminating groups which may be formed by emulsifying a hydroxyl endblocked polydiorganosiloxane at a pH of 9 to 11.5.

The preferred method of preparing the silicone emulsions is to emulsify a hydroxyl endblocked polydiorganosiloxane using an anionic surfactant, add the colloidal silica, and then adjust the pH within the range of 10.5 to 11.5 inclusive. The preferred method for emulsifying a hydroxyl endblocked polydiorganosiloxane is to prepare this siloxane polymer by emulsion polymerization as described in U.S. Pat. No. 3,294,725, starting with polydiorganocyclosiloxanes. This emulsion polymerization uses an anionic polymerization catalyst and thus the resulting hydroxyl endblocked polydiorganosiloxane contains an anionic surfactant and thus it is ready to be used to make the silicone emulsions of this invention. There are other methods of emulsifying a hydroxyl endblocked polydiorganosiloxane using an anionic surfactant, such as described in U.S. Pat. No. 2,891,920. Although these other methods can be used to emulsify a hydroxyl endblocked polydiorganosiloxane to provide an anionically stabilized siloxane polymer, they are less convenient inasmuch as additional steps are involved, as well as additional ingredients. The concentration of the hydroxyl endblocked polydiorganosiloxane in the anionically stabilized emulsion is not critical, however, it must be high enough to provide a suitable concentration of dispersed phase in the final silicone emulsion when mixed with the other ingredients.

The colloidal silica can be added to the anionically stabilized hydroxyl endblocked polydiorganosiloxane in the form of a dry powder or as an aqueous dispersion. The best method of adding colloidal silica is in the form of a sodium ion stabilized aqueous dispersion of colloidal silica. There are many such sodium ion stabilized aqueous dispersions of colloidal silica which are commercially available. These commercial colloidal silicas are usually available in aqueous dispersion having from 15 to 50 weight percent colloidal silica and having a pH in the range of 8.5 to 10.5. The best method for adding fume silica is by simply stirring it into the hydroxyl endblocked polydiorganosiloxane emulsion.

After the colloidal silica is added, the pH is adjusted to 9 to 11.5. Silicone emulsions, as described herein, are not storage stable or do not form an elastomeric product over the entire storage period if the pH is adjusted below 9.

The pH of the silicone emulsion prepared as described herein can be adjusted within the defined range by any of a number of methods, such as with a basic compound or an ion exchange means, such as an ion exchange resin. The best methods have been found to be with a basic compound, such as an organic amine, an alkali metal hydroxide or a combination thereof. The organic amines can be primary, secondary, or tertiary amines which contain carbon, hydrogen, and nitrogen, and can also contain oxygen, and which are water soluble in the amounts required. These organic amines include diethylamine, ethylenediamine, butylamine, hexylamine, morpholine, monoethanolamine, triethylamine, and triethanolamine. The preferred organic amine for maximum storage stability is diethylamine. The alkali metal hydroxides include sodium hydroxide, potassium hydroxide, rubidium hydroxide, and cesium hydroxide. The preferred alkali metal hydroxide is sodium hydroxide. The organic amine can be added neat or in aqueous solution. The alkali metal hydroxides are preferably added as an aqueous solution. A combination of diethylamine and sodium hydroxide have been found to be particularly suitable to provide long term storage stability for these silicone emulsions, maintaining the useful elastomer forming ability, and maintaining useful elastomeric properties in the product obtained after removal of the water at ambient conditions.

The useful upper pH level is determined by practical considerations. The higher the pH, the more corrosive the silicone emulsion becomes so there should not be an excess of basic compound added. When the pH is above 12, colloidal silica present tends to be dissolved. The system tends to change in pH with time, adjusting to a range of from 10.5 to 11.5.

With the proper selection of anionically stabilized hydroxyl endblocked polydiorganosiloxane and colloidal silica, the mixing of these two ingredients can automatically adjust the pH within the required range and an additional step of adjusting the pH is not needed. Thus, the mixing of the siloxane and colloidal silica can encompass the step of adjusting the pH. The selection of a hydroxyl endblocked polydiorganosiloxane which has a pH of at least 9 and an aqueous dispersion of a colloidal silica which has a pH of at least 9 can provide a silicone emulsion within the scope of this invention without further necessity of adjusting the pH by adding additional ingredients. An aqueous dispersion of a colloidal silica which is sodium ion stabilized is preferably used as the colloidal silica with a pH above 9. It is not necessary that both the siloxane and colloidal silica have a pH above 9, but the resulting combination would be required to have a pH greater than 9. If not, adjusting the pH would be required as stated above. To obtain the preferred pH range of 10.5 to 11.5, it will usually require adjusting the pH after the siloxane polymer and colloidal silica are mixed. For the purpose of this invention, the term "pH" means the electrical potential measured on commercially available glass electrodes designed for this purpose when the glass electrode is immersed in the emulsion. The electrical potential is read from a scale on a commercial instrument in terms of the negative $\log_{10}$ of hydrogen ion activity. The electrode is calibrated with a standard buffer solution which gives a pH of 10.

In the method of preparing the silicone emulsion as described above, frothing can be encountered. It is therefore advantageous to add an antifoaming agent (an antifoam) to control such frothing. A preferred class of antifoams are those based on silicones which are available commercially.

The mixtures of the instant invention are manufactured by mixing the silicone emulsion described above with mineral particles. The mixing can be accomplished by any of the well known mixing methods such as stirring or kneading either by hand or by machine. The mixing can also be accomplished by an impregnation process where one of the ingredients is placed in a container, then the other is added, the mixing taking place through the force of gravity causing the two ingredients to combine. For instance, a container can be partially filled with a silicone emulsion, then mineral particles are added. The mineral particles will move down through the emulsion because of their density. Using enough of the mineral particles to fill the container and displace any excess emulsion would yield a container full of a uniform mixture of silicone emulsion and mineral particles.

A similar final product could be produced by filling a container with mineral particles, then filling the voids between the particles with silicone emulsion by pouring the silicone emulsion onto the surface and allowing the emulsion to displace the air in the voids. A practical method of manufacturing a mixture in such a case would be to evacuate the air from the container by placing it in a vacuum chamber, pouring the emulsion onto the surface of the mineral particles and then removing the vacuum to allow air pressure to aid in forcing the emulsion into the voids between the particles. These methods yield a mixture in which the emulsion ratio to mineral particle ratio by volume is controlled by the amount of voids between the mineral particles. The void volume of the mineral particles is a function of their size and shape, and the distribution of sizes that are present. If a variety of sizes of mineral particles are used, the smaller particles will occupy the voids between the larger particles and thus reduce the void volume.

The mineral particles used in the mixture of this invention have a minimum average particle size of 150 micrometers. They are orders of magnitude larger than the filler particles used in the silicone emulsion. Where the mixture is to be used as a protective coating on a building surface, as a replacement for plaster for instance, the mineral particles would be most useful in a size similar to ordinary sand particles, for instance from 200 micrometers up to 2 mm. If the mixture is to be used as a coating or covering of a thickness such as 10 mm or greater, the mixture can contain mineral particles of up to 10 mm in diameter, in the same manner that concrete is prepared using a variety of sizes of particles, so that the maximum amount of the volume of the cured mixture is composed of mineral particles with a minimum volume of the cured mixture being the cured silicone elastomer.

The ratio of mineral particles to silicone elastomeric emulsion in the mixture of this invention can vary over wide limits. In order to obtain the desired final product, the nature of the mixture as manufactured, the nature of the mixture after it is cured by drying to remove the water, and the method of use of the mixture must all be considered.

In order to be useful as a coating, the mixture as manufactured should be a paste-type material. If there is not enough liquid present in the emulsion, or the emulsion is too high a viscosity, the mixture will be a dough-like material and will not be easily applied, as by troweling for instance. If the amount of liquid is too high, or the emulsion is too low a viscosity, the viscosity of the mixture will be low and the mineral particles will settle out on standing due to their density. For these reasons, a mixture that is of a paste-type consistency is most practical. Other viscosities could be used, a thinner viscosity for spray gun application for example. In such a use, the mixture would have to be stirred before and during use to maintain a uniform mixture.

When the mixture is dried to yield a cured coating, the nature of the cured coating is dependent upon the ratio of mineral particles to silicone elastomer. For a given emulsion and a given type of mineral particles, as the amount of silicone elastomer is reduced in proportion to the amount of mineral particles, the cured material gradually changes from a nonporous material to a porous material as there is no longer sufficient silicone elastomer present to completely seal the voids between mineral particles as the silicone emulsion dries. For example, when the ratio of silicone elastomer to uniformly sized mineral particles is about 1 volume of elastomer to 3 volumes of mineral particles, the cured coating is a solid appearing material as there is sufficient silicone elastomer present to fill the space between the mineral particles. At a ratio of 1 volume of silicone elastomer to 40 volumes of uniformly sized mineral particles, such as sized sand, the cured mixture is porous and rigid as the cured material is in the form of particles bonded together where they touch as there is not sufficient silicone elastomer present to seal the voids. Such a coating would exhibit water repellency because of the presence of the silicone elastomer, but the coating would not be waterproof; that is, liquid water could be forced through the porous coating. When using mineral particles such as sized sand, a ratio of 1 volume of silicone elastomer to 7 to 10 volumes of mineral particles gives a nonporous, cured material that is tough and flexible to provide a waterproof coating for the protection of a substrate.

A mixture comprising 1 part by volume of silicone emulsion having a solids content of 50 percent by weight and 3 to 4 parts by volume of mineral particles such as sand, when dried, yields a cured mixture of about 1 part of silicone elastomer by volume to 7 to 10 parts by volume of mineral particles. Such a mixture is of an easily trowelable, paste-like consistency. When applied to a substrate, such as a foam or wooden wall in a building, and dried, and coating is a tough, flexible, nonporous material. When applied in a thickness such as 3 to 11 mm, the coating protects the substrate from mechanical damage and weathering. Such a coating is flame resistant, so it also protects the substrate from fire.

A useful mixture can also be manufactured by using mineral particles that are a number of sizes. The largest useful mineral pieces are determined by the thickness of the coating to be applied. Smaller particles are then selected that will fit into the voids left between the large pieces. Still smaller particles can be added to fit into the voids left between the smaller particles. Such a mixture of mineral particles has a minimum of void space so that the amount of silicone elastomer necessary to provide a nonporous, cured coating is reduced from the amount necessary to provide a nonporous coating where the mineral particles are all of a similar size.

The following examples are presented for purposes of illustrating the invention and should not be construed as limiting the scope of the invention which is properly delineated in the claims.

EXAMPLE 1

A silicone elastomeric emulsion was prepared by mixing 100 parts by weight of an aqueous sodium stabilized colloidal silica dispersion having about 15 percent by weight silica with 2 parts by weight diethylamine. Then 167 parts by weight of an anionically stabilized emulsion polymerized polydimethylsiloxane containing about 58 percent by weight of hydroxyl endblocked polydimethylsiloxane having a weight average molecular weight of about 325,000 was added. Next, 0.3 part by weight of an antifoam emulsion and 1 part by weight of a 50 percent by weight dioctyltindilaurate emulsion (Tin Emulsion A) were mixed in until uniform. Then 10 parts by weight of an acrylic thickening agent was mixed in until a uniform mixture resulted. This silicone elastomeric emulsion had a viscosity of about 25 Pa·s at 23° C., a pH of about 11, and a solids content of about 40 percent by weight.

A quantity of sand was impregnated with the above silicone elastomeric emulsion by filling a glass jar ¼ full with the emulsion. Wedron white silica sand #4030, (Wedron Silica Div. DelMonte. Properties Co., Park Ridge, IL), having particles varying from about 600 micrometers to 150 micrometers in diameter with an average diameter of about 400 micrometers, was then poured into the jar with stirring until the jar was full. The resulting mixture, in a ratio of 1 volume of emulsion to 3 volumes of sand, was of a trowelable consistency. The mixture was storage stable as long as the jar was sealed so that the water could not evaporate.

The mixture was troweled onto a coated kraft paper substrate and allowed to dry, the cured coating was a hard, but flexible, textured material. The coating held in the flame of a Bunsen burner did not support combustion, but slowly degraded.

EXAMPLE 2

This example illustrates the use of the mixture of this invention as a coating over a foam insulation panel.

A mixture was prepared by mixing one part by volume of the silicone elastomeric emulsion of Example 1 with 3.5 parts by volume of Wedron #4030 silica sand.

Samples of flame retardant polystyrene foam insulation panels 25.4 mm thick were primed with Drylock ® sealer (United Gilsonite Laboratories, Scranton, PA), a solvent dispersion of cement and sand, and dried overnight. The above mixture was then troweled onto the surface of the primed insulation panels, one sample had a coating thickness of about 3 mm and another was prepared with a coating thickness of about 11 mm. The coated panels were then allowed to dry for 7 days. The cured panels were tested by placing them over a Bunsen burner for one minute so that the surface was at the tip of the flame at the hottest position. On the sample with the 3 mm coating, the foam melted away from the back side of the coating to approximately 75 mm from the flame center. The coating remained intact and did not support combustion.

The panel with the 11 mm coating had only a slight depression in the foam directly behind the coating at the location of the flame center.

Both of the coated panels withstood a sharp blow with a hammer without cracking the coating. The 11 mm coating was strong enough to protect the foam substrate from any damage from the hammer blows.

EXAMPLE 3

Mixtures similar to those of Example 2 were prepared at various ratios of silicone elastomeric emulsion to sand up to 1:16. As the ratio of sand is increased, the cured mixture becomes harder and more rigid. At a ratio of 1:16, the mixture is rigid with the sand bound together.

That which is claimed is:
1. A uniform mixture consisting essentially of
(A) an aqueous silicone elastomeric emulsion comprising (i) 100 parts by weight of an anionically stabilized, hydroxyl endblocked polydiorganosiloxane present as an oil-in-water emulsion, (ii) from 1 to 150 parts by weight of colloidal silica having an average particle diameter of less than 0.5 micrometers, (iii) from 0 to 200 parts by weight of filler other than colloidal silica, said filler having an average particle diameter of less than 10 micrometers, and (iv) from 0.1 to 2.0 parts by weight of alkyl tin salt, said emulsion having a pH of 9 to 11.5, and (B) mineral particles having an average particle diameter of greater than 150 micrometers, the ratio of (A) to (B) being such that upon the removal of the water, there is present 1 part by volume of silicone elastomer from (A) and from 3 to 40 parts by volume of (B).

2. The mixture of claim 1 in which the silicone elastomeric emulsion also contains greater than 1 part by weight of an organic amine composed of carbon, hydrogen, and nitrogen atoms, or carbon, hydrogen, nitrogen and oxygen atoms, said amine being soluble in the amount of water present in the emulsion.

3. The mixture of claim 2 in which the polydiorganosiloxane (i) has a weight average molecular weight in the range of 200,000 to 700,000; the colloidal silica (ii) is in the form of a sodium stabilized colloidal silica dispersion in an amount of from 15 to 50 parts by weight; the alkyl tin salt (iv) is from 0.25 to 1.0 part by weight of dialkyltindicarboxylate; and the amine is selected from the group consisting of diethylamine, monoethanolamine, and morpholine, and the solids content of the emulsion is greater than 25 percent by weight based upon the total weight of the emulsion.

4. The mixture of claim 3 in which the mineral particles have an average particle diameter of from 200 micrometers to 2000 micrometers.

5. The mixture of claim 4 in which the volume of mineral particles (B) is from 7 to 10 parts, based upon 1 part by volume of silicone elastomer from (A).

6. A method of coating a substrate consisting essentially of
(1) applying the mixture of claim 1 to the substrate, and
(2) drying the applied mixture.

7. A method of coating a substrate consisting essentially of
(1) applying the mixture of claim 5 to the substrate, and
(2) drying the applied mixture.

8. A method of coating a surface of a structure consisting of consisting essentially of
(1) applying the mixture of claim 1 to the surface of the structure, and
(2) drying the applied mixture.

9. A method of coating a surface of a structure consisting essentially of
(1) applying the mixture of claim 5 to the surface of the structure, and
(2) drying the applied mixture.

10. The method of claim 8 or 9 in which the surface of the structure is foam insulation.

11. The method of claim 8 or 9 in which the surface of the structure is wood.

12. The method of claim 8 or 9 in which the surface of the structure is vertical.

13. The coated substrate of claim 6.

14. The coated substrate of claim 7.

* * * * *

UNITED STATES PATENT AND TRADEMARK OFFICE
CERTIFICATE OF CORRECTION

PATENT NO.    : 4,505,955
DATED         : March 19, 1985
INVENTOR(S)   : Michael D. Meddaugh It is certified that error appears in the above-identified patent and that said Letters Patent is hereby corrected as shown below:

In Column 11, line 7, the words "from 0" should read "up".

Signed and Sealed this

Sixteenth Day of July 1985

[SEAL]

Attest:

DONALD J. QUIGG

*Attesting Officer*     *Acting Commissioner of Patents and Trademarks*